(12) United States Patent
Hatanaka et al.

(10) Patent No.: US 7,881,047 B2
(45) Date of Patent: Feb. 1, 2011

(54) ELECTRONIC APPARATUS

(75) Inventors: Hiroshi Hatanaka, Kobe (JP); Shinsuke Matsumoto, Kobe (JP)

(73) Assignee: Fujitsu Ten Limited, Hyogo (JP)

( * ) Notice: Subject to any disclaimer, the term of this patent is extended or adjusted under 35 U.S.C. 154(b) by 77 days.

(21) Appl. No.: 12/453,264

(22) Filed: May 5, 2009

(65) Prior Publication Data

US 2009/0279235 A1 Nov. 12, 2009

(30) Foreign Application Priority Data

May 9, 2008 (JP) ............................ P2008-124068

(51) Int. Cl.
*G06F 1/16* (2006.01)
(52) U.S. Cl. ................... 361/679.01; 200/314; 174/261; 347/94; 369/30.36
(58) Field of Classification Search ............ 200/341, 200/61.57, 314, 61.54; 364/679.01, 679.37, 364/679.33, 679.43, 679.41, 679.44, 679.32; 174/254, 72 A, 261; 347/71, 94, 42, 50; 455/575.7, 550.1; 369/44.19, 30.36, 121
See application file for complete search history.

(56) References Cited

U.S. PATENT DOCUMENTS

2009/0279236 A1*  11/2009  Hatanaka ............... 361/679.01
2009/0294155 A1*  12/2009  Suzuki et al. ............... 174/254
2010/0224471 A1*   9/2010  Sakai ........................ 200/341

FOREIGN PATENT DOCUMENTS

| JP | 3-273944 | 12/1991 |
| JP | 5-105003 | 4/1993 |
| JP | 7-320440 | 12/1995 |
| JP | 2002-337620 | 11/2002 |
| JP | 2004-7135 | 1/2004 |

* cited by examiner

*Primary Examiner*—Hung V Duong
(74) *Attorney, Agent, or Firm*—Harness, Dickey & Pierce, P.L.C.

(57) ABSTRACT

An electronic apparatus includes an electronic apparatus main body; and a movable body which is mounted in the electronic apparatus main body, with its predetermined direction-wise one end supported thereon, so as to be displaceable between an encased condition where its one surface faces the main body and an unfolded condition where the one surface is exposed. The electronic apparatus main body and the movable body are so arranged that, in the movable-body encased condition, orthographical projections in the predetermined direction, respectively, of at least a part of the other end portion of the movable body in the predetermined direction and at least a part of that area of the electronic apparatus main body which is opposed to the other end portion of the movable body are kept in superposed relation with each other.

7 Claims, 7 Drawing Sheets

ELECTRONIC APPARATUS

BACKGROUND OF THE INVENTION

1. Field of the Invention

The present invention relates to an electronic apparatus having an electronic apparatus main body and a movable body which is mounted in the electronic apparatus main body.

2. Description of the Related Art

For example, in an electronic apparatus according to the first conventional art having a display as a movable body, the display is adapted to be displaceable between a state of being encased in a cover, or equivalently an encased condition, and a state of being exposed from the cover, or equivalently an unfolded condition (for example, refer to Japanese Unexamined Patent Publication JP-A 3-273944 (1991)). The display, now in the encased condition, is caused to slide, with its display screen pointing downward, so as to jut out from the cover, and then undergoes angular displacement about an axis which is perpendicular to the direction in which the display slides so as to be brought into the unfolded condition.

Moreover, in an electronic apparatus according to the second conventional art having, like the first conventional art, a display as a movable body, there is provided a lid body for covering, in a condition where the display is encased in a casing, or equivalently a display encased condition, that part of the electronic apparatus which is opened for encasing the display (for example, refer to Japanese Unexamined Patent Publication JP-A 5-105003 (1993)).

In the electronic apparatus of the first conventional art, however, a gap is created between the display and the cover in the display encased condition where the display is encased in the cover. In this case, there is a risk of inadvertent insertion of foreign matters into the gap. Particularly in a case where such an electronic apparatus is installed in a motor vehicle along with audio equipment in which is set a recording medium in an insertable and removable manner, there is a risk that the recording medium could be inserted accidentally into the gap of the electronic apparatus.

On the other hand, in the electronic apparatus of the second conventional art, although the wrong insertion of the recording medium can be prevented by the provision of the lid body, the lid body needs to be prepared as a separate component and also needs to be adapted to move in synchronism with displacement of the display. As a result, the structure of the electronic apparatus is complicated and the number of assembly process steps is increased correspondingly. This gives rise to a problem of a decline in productivity.

SUMMARY OF THE INVENTION

Accordingly, an object of the invention is to provide an electronic apparatus in which insertion of foreign matters into a space between a movable body and an electronic apparatus main body can be prevented successfully without increasing structural complexity.

An electronic apparatus of the invention comprises an electronic apparatus main body and a movable body. One end portion in a predetermined direction of the movable body is supported by the electronic apparatus main body. The movable body is mounted in the electronic apparatus so as to be displaceable between an encased condition where one surface portion of the movable body is opposed to the electronic apparatus main body and an unfolded condition where the one surface portion is exposed to the outside.

The electronic apparatus main body and the movable body being so arranged that, in the movable-body encased condition, orthographical projections in the predetermined direction, respectively, of at least a part of the other end portion of the movable body in the predetermined direction and at least a part of that area of the electronic apparatus main body which is opposed to the other end portion of the movable body are kept in superposed relation with each other.

According to the invention, the electronic apparatus main body and the movable body having its one end portion in the predetermined direction supported by the electronic apparatus main body are so arranged that, in the movable-body encased condition, the orthographical projections in the predetermined direction, respectively, of at least a part of the other end portion of the movable body in the predetermined direction and at least a part of that area of the electronic apparatus main body which is opposed to the other end portion of the movable body are kept in superposed relation with each other. In this construction, even if a gap is present between the movable body and the electronic apparatus main body in the movable-body encased condition, a foreign matter, which is about to be inserted from the side of the other end portion of the movable body into the space between the electronic apparatus main body and the movable body, is abutted against any of the other end portion of the electronic apparatus main body and the other end portion of the movable body in the course of insertion. Accordingly, the foreign matter is inhibited from finding its way into the gap between the movable body and the electronic apparatus main body.

Moreover, there is no need to provide an extra component for preventing insertion of foreign matters independently of the electronic apparatus main body and the movable body. Therefore, it never occurs that the structure of the electronic apparatus is complicated and the number of assembly process steps is increased correspondingly. This makes it possible to avoid a decline in productivity.

BRIEF DESCRIPTION OF THE DRAWINGS

Other and further objects, features, and advantages of the invention will be more explicit from the following detailed description taken with reference to the drawings wherein.

DETAILED DESCRIPTION

Now referring to the drawings, preferred embodiments of the invention will be described in detail.

Figure 1A:
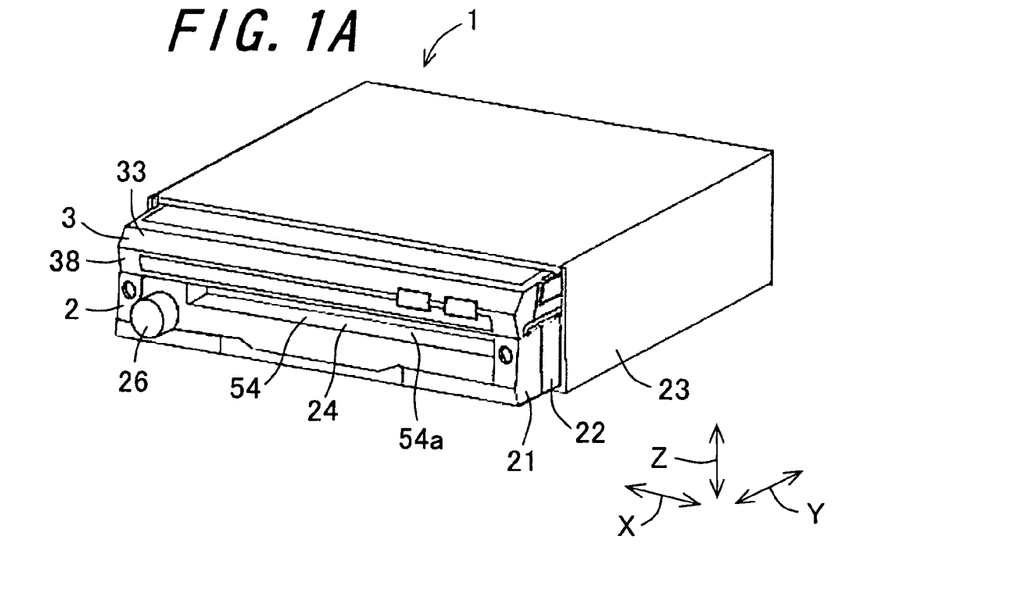
FIGS. 1A and 1B are perspective views showing part of the structure of a navigation system implemented by way of an electronic apparatus in accordance with one embodiment the invention.
Figure 1B:
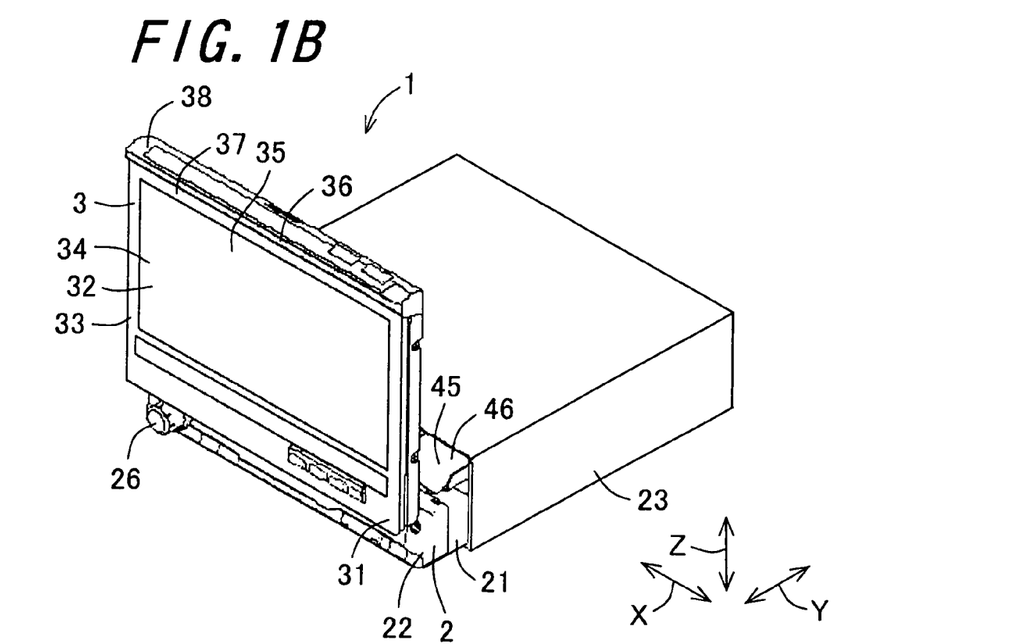
Figure 2:
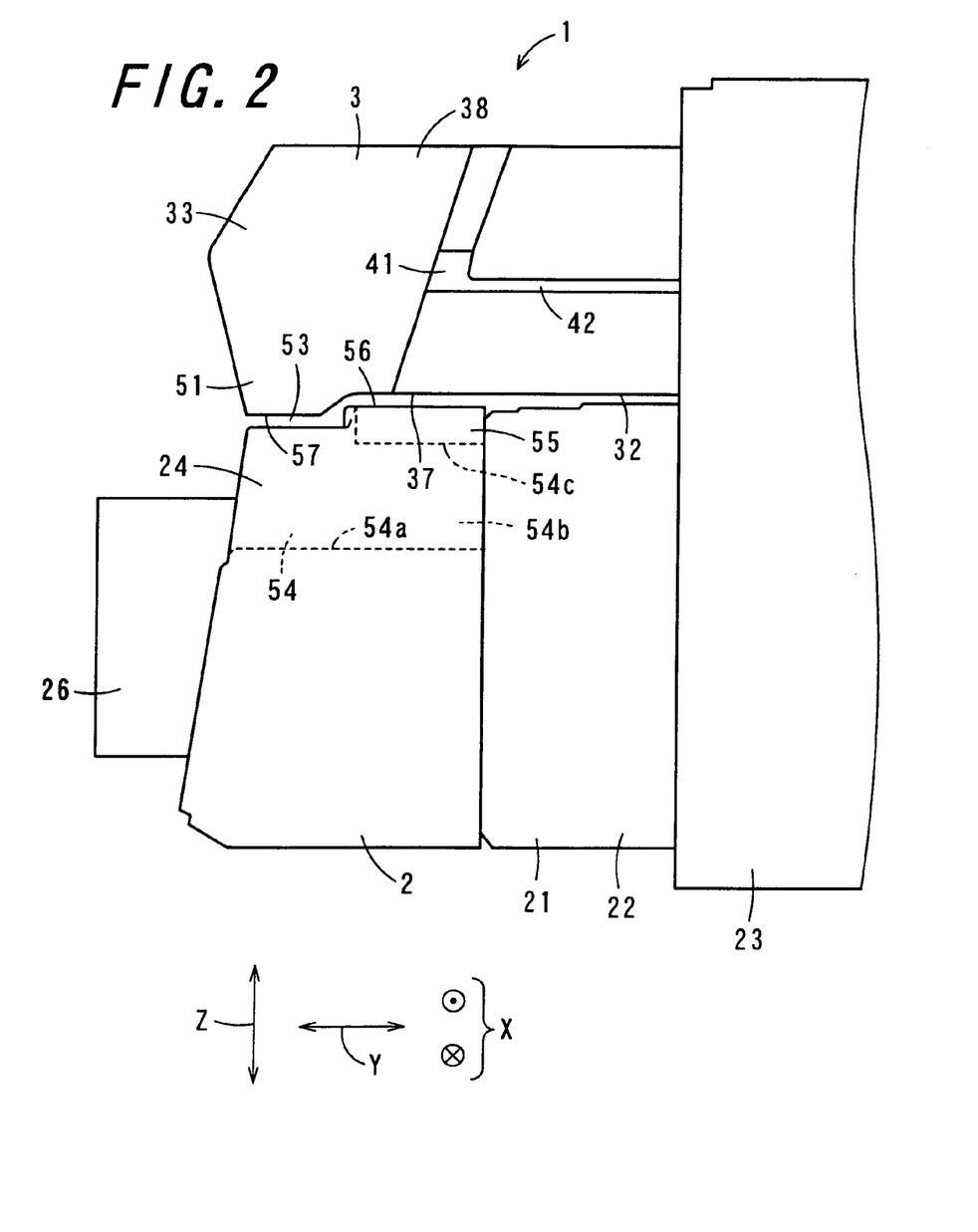
FIG. 2 is a side view of the navigation system in the movable-body encased condition.

FIGS. 1A and 1B are perspective views showing part of the structure of a navigation system 1 implemented by way of an electronic apparatus in accordance with one embodiment the invention. FIG. 1A shows a movable-body encased condition where a movable body 3 assumes an encased position, and FIG. 1B shows a movable-body unfolded condition where the movable body 3 assumes an unfolded position. FIG. 2 is a side view of the navigation system 1 in the movable-body encased condition. The navigation system 1 is built as an in-dash type car navigation system which is installed in a dashboard of a motor vehicle. The navigation system 1 offers, in addition to a navigating capability, an audio capability, a motion-picture replay capability, and so forth.

The navigation system 1 comprises an electronic apparatus main body 2 and the movable body 3.

The electronic apparatus main body 2 includes a first casing 21 and a second casing 23 for supporting the first casing 21 in such a manner that one end portion 22 of the first casing 21 in a predetermined direction is exposed to the outside. The first casing 21 and the second casing 23 are each formed in substantially rectangular parallelepiped shape. The navigation system 1 is adapted to conform with the standard of 1DIN, that is, 180 mm in width, 50 mm in height, 200 mm in depth. For installation in a motor vehicle, the navigation system 1 is inserted into a 1DIN size-adaptable insertion hole formed in a dashboard of the motor vehicle. Note that, in the following description, the direction of the width of the electronic apparatus main body 2 is defined as the X direction, the aforementioned predetermined direction, or equivalently the direction of the depth of the electronic apparatus main body 2 is defined as the Y direction, and the direction of the height of the electronic apparatus main body 2 is defined as the Z direction.

The first casing 21 of the electronic apparatus main body 2 has, at its one end portion 22 in the Y direction, an opening portion 24 for the insertion and ejection of a recording medium. In this embodiment, the recording medium refers to a disc-shaped recording medium such as a CD (Compact Disc), a DVD (Digital Versatile Disc), and a BD (Blu-ray Disc). The opening portion 24 is formed at one end portion of the first casing 21 in the Z direction. In other words, with the navigation system set in place, the opening portion 24 is located at the upper end portion of the first casing 21 and opens into the side of one end of the first casing 21 in the Y direction. Disposed within the first casing 21 are: a reading/reproducing section including an optical pickup device, for reading and reproducing information recorded on a recording medium; a memory section for storing therein navigation information such as map data; and a navigation processing section for effecting route navigation on the basis of navigation information stored in the memory section or navigation information read out from the recording medium and information provided from a non-illustrated GPS (Global Positioning System) device. Moreover, in the area of one end portion 22 of the first casing 21 other than the area where the opening portion 24 is formed, there is disposed an operating section including a volume switch 26, for effecting input of various instructions as to the navigating capability and the audio capability or the motion-picture replay capability.

The movable body 3 has the shape of a low-profile rectangular parallelepiped having a substantially rectangular shape in a plan view. The movable body 3 is mounted in the electronic apparatus main body 2 so as to be displaceable between a state of assuming an encased position, or equivalently an encased condition where its thicknesswise one surface portion 32 is opposed to the electronic apparatus main body 2, and a state of assuming an unfolded position, or equivalently an unfolded condition where the thicknesswise one surface portion 32 is exposed to the outside. The movable body 3 is, at its one end portion 31 in a predetermined direction which is perpendicular to the X direction and a direction perpendicular to the direction of the thickness of the movable body 3, supported by the electronic apparatus main body 2. In the movable-body encased condition, there is secured a gap between the electronic apparatus main body 2 and the movable body 3. The size of the gap in the Z direction is so selected as to avoid that the confronting parts of the electronic apparatus main body 2 and the movable body 3 make contact with each other due to vibrations in the movable-body encased condition. For example, the size of the gap in the Z direction is so selected as to fall in a range of from 1.5 mm to 2 mm.

The movable body 3 has a third casing 33 and a display section 34. The display section 34 retained in the third casing 33, has a liquid crystal display panel and a touch panel formed so as to cover the liquid crystal display panel. In the area of one surface portion 32 of the movable body 3 other than the area where an outer edge 36 lies, a display screen 35 of the display section 34 is so disposed as to be exposed to the outside. The display screen 35 of the display section 34 is so formed as to be recessed inwardly relative to one surface 37 of the third casing 33. The display section 34 is electrically connected to the electronic apparatus main body 2 by way of a flexible wiring board.

With the navigation system 1 set in place, the movable body 3 is located above the first casing 21; that is, it is located on the side of one surface of the first casing 21 in the Z direction. In the movable-body encased condition, the movable body 3 is encased, with the exclusion of a free end portion 38 which is the other end portion thereof in the predetermined direction, in the second casing 23. In the movable-body encased condition, the free end portion 38 of the movable body 3 faces the end portion of the electronic apparatus main body 2; that is, the free end portion 38 is opposed to one end portion 22 of the second casing 23.

In the movable body 3, on each of the opposite side faces 41 of the third casing 33 in the X direction, there is formed a slot 42 extending in the predetermined direction. The second casing 23 is formed with a guide rail portion which is inserted into the slot 42. In the movable-body encased condition, the guide rail portion is inserted along the slot 42.

The second casing 23 is provided with a displacing section 45 for effecting displacement of the movable body 3. The displacing section 45 includes a slidingly displacing portion and an angularly displacing portion. The slidingly displacing portion allows the movable body 3 to be displaced in the Y direction, under a condition where the thicknesswise one surface portion 32 of the movable body 3 is opposed to the electronic apparatus main body 2. The angularly displacing portion allows the movable body 3 to make angular displacement about an axis extending in a widthwise direction (the X direction) which is perpendicular to a direction in which the electronic apparatus main body 2 and the movable body 3 stack one upon another (the Z direction) and to a direction in which the movable body 3 is displaced by the slidingly displacing portion (the Y direction).

Figure 3A:
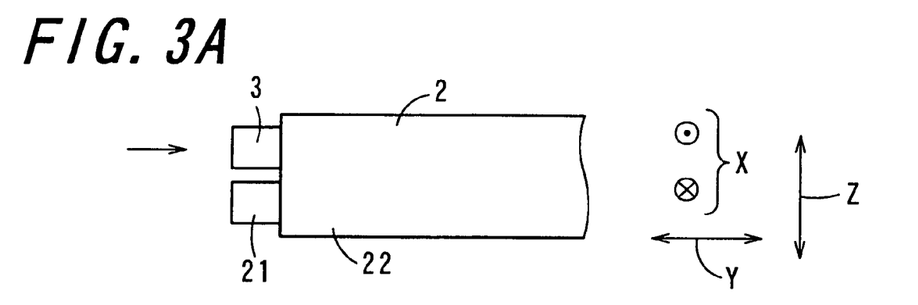
FIGS. 3A to 3D are diagrams for explaining displacement of a movable body.
Figure 3B:
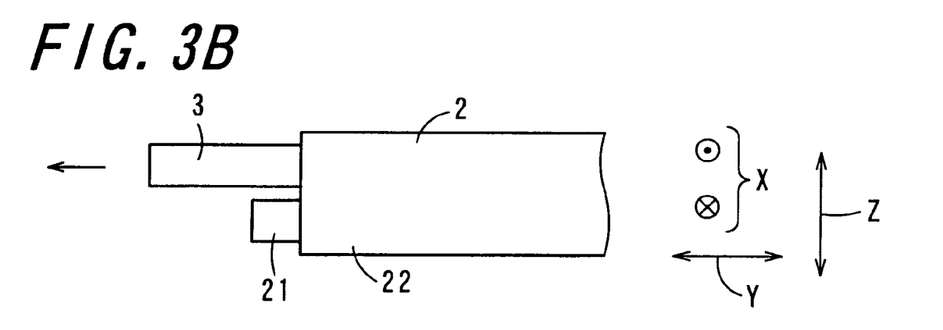

FIGS. 3A to 3D are diagrams for explaining displacement of the movable body 3. The displacing section 45 includes a holding portion 46 for holding one end portion 31 of the movable body 3 while allowing displacement in the X direction. The slidingly displacing portion includes a first motor and a first gear group disposed in the holding portion 46, and a rack gear. The rack gear is disposed in the second casing 23 so as to extend in the Y direction and engages with the gear wheels of the first gear group to which is imparted power from the first motor. As the rotary shaft of the first motor is rotated, the first gear group is caused to turn, whereupon the gear wheels of the first gear group engage with the rack gear thereby to displace the holding portion 46 in the Y direction. At this time, as shown in FIGS. 3A and 3B, the movable body 3 is moved in the Y direction.

Figure 3C:
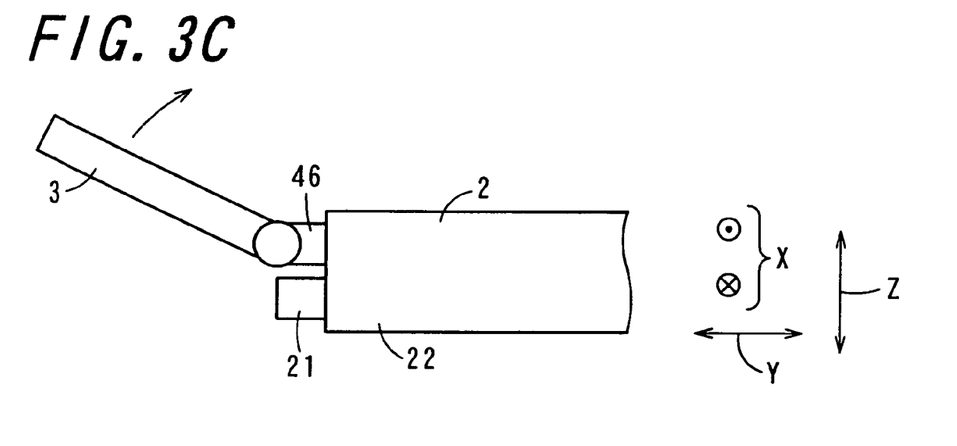
Figure 3D:
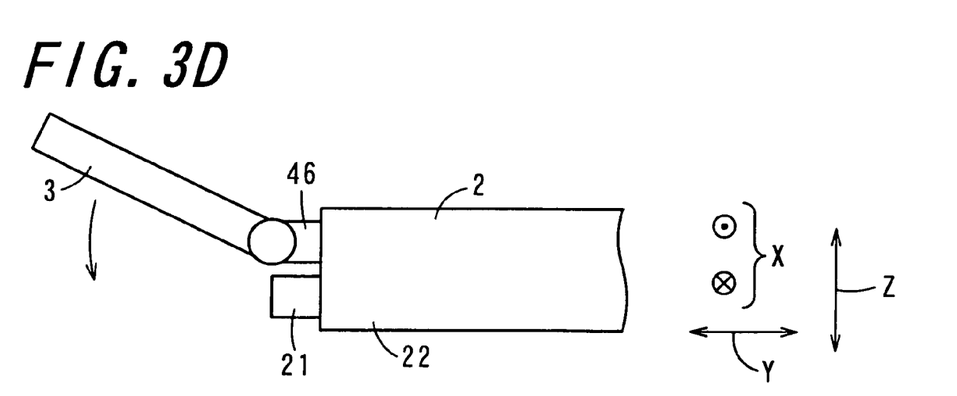

The angularly displacing portion includes a second motor and a second gear group disposed in the holding portion 46, and a third gear secured to second casing 23. The third gear, which is disposed coaxially with the axis about which the movable body 3 is angularly displaced, engages with the gear wheels of the second gear group. As the rotary shaft of the second motor is rotated, the second gear group is caused to turn, whereupon the gear wheels of the second gear group engage with the third gear. At this time, as shown in FIGS. 3C and 3D, the movable body 3 is angularly displaced about the axis extending in the X direction.

Referring to FIG. 2 once again, the electronic apparatus main body 2 and the movable body 3 are so arranged that, in the movable-body encased condition, the orthographical projections in the predetermined direction, respectively, of at least a part of the free end portion 38 of the movable body 3 and at least a part of that area of the electronic apparatus main body 2 which is opposed to the free end portion 38 of the movable body 3 (one end portion 22 of the second casing 23) are kept in superposed relation with each other. In the movable-body encased condition, the predetermined direction is parallel to the Y direction. In other words, with the navigation system 1 set in place, at least a part of the free end portion 38 of the movable body 3 is located below the upper end face of one end portion 22 of the second casing 23.

By arranging the electronic apparatus main body 2 and the movable body 3 in that way, even in the presence of a gap between the electronic apparatus main body 2 and the movable body 3, it is possible to prevent insertion of a foreign matter into the gap between the electronic apparatus main body 2 and the movable body 3 from the side of one end of the construction in the Y direction; that is, from the side of the front face of the construction.

The free end portion 38 of the movable body 3 has an outwardly extending protrusion 51 located toward the other end thereof in the predetermined direction. The protrusion 51 is formed in the third casing 33 so as to extend beyond thicknesswise one surface portion of the movable body 3. That is, in the movable-body encased condition, the protrusion 51 extends toward the second casing 23. The protrusion 51 is formed at the end of the movable body 3 in the predetermined direction so as to extend across the opposite ends of the movable body 3 in the X direction. The protrusion 51 has a substantially trapezoidal sectional profile as seen in the widthwise direction.

That part of the electronic apparatus main body 2 which is opposed to the protrusion 51 in the movable-body encased condition is formed with a concavity 53. The concavity 53 is formed at one end of one end portion 22 of the first casing 21 in the Y direction. In the movable-body encased condition, the protrusion 51 is received in the space constituting the concavity 53, and the lowermost end of the protrusion 51 is located below the uppermost end of the first casing 21. In the case of forming the protrusion 51 and the concavity 53 such as shown herein, since it never occurs that the protrusion 51 acts to restrain the movable body 3 from the movement in the Y direction effected by the slidingly displacing portion, the movable body 3 is allowed to move straightly in the Y direction by the slidingly displacing portion. Accordingly, the provision of the protrusion 51 will not lead to an increase in structural complexity in the slidingly displacing portion.

Referring to FIGS. 1A, 1B and 2, broadly speaking, the opening portion 24 is defined by surrounding the periphery of a rectangular parallelepiped space both in the X direction and the Z direction. The inner peripheral surface of the opening portion 24 is formed with an opening guideway 54 for guiding a recording medium. With the navigation system 1 set in place, the opening guideway 54 includes a lower opening guideway 54a constituting the lower face thereof, a side opening guideway 54b merging with each of the opposite ends of the lower opening guideway 54a in the X direction, and an upper opening guideway 54c which is opposed to the lower opening guideway 54a and merges with the side opening guideways 54b merging with the ends of the lower opening guideway 54a in the X direction, respectively. The lower opening guideway 54a and the side opening guideway 54b are so formed as to extend to one end of the opening portion in the Y direction. On the other hand, the upper opening guideway 54c is so formed as to extend to a position aside from one end of the opening portion in the Y direction. On the side of one end of the upper opening guideway 54c in the Y direction, there is formed the concavity 53. The lower opening guideway 54a and the side opening guideway 54b are thus exposed upward at their one end portions in the Y direction. At least one of the upper opening guideway 54c and the lower opening guideway 54a may be inclined in such a manner that the opening becomes larger gradually from the other end to one end of the opening portion in the Y direction. In this case, a recording medium can be guided smoothly along the opening guideway 54.

In the movable-body encased condition, the protrusion 51 of the movable body 3 is located relatively on the upwardly exposed areas of the Y direction-wise one end portions, respectively, of the lower opening guideway 54a and the side opening guideway 54b. Therefore, in the movable-body encased condition, the protrusion 51 of the movable body 3 constitutes a guide path for guiding a recording medium to the opening portion 24. By disposing the protrusion 51 so as to constitute the guide path in that way, it is possible to obtain as wide an opening as possible in the opening portion 24, and thereby allow easy insertion and easy removal of a recording medium in and from the opening portion 24.

The opening portion 24, the third casing 33, and the protrusion 51 are each made of a synthetic resin material such for example as an alloy of ABS (acrylonitrile butadiene styrene) resin and PC (polycarbonate) resin, polyacetal, or the like. Since the opening portion 24 and the protrusion 51 are each made of such a synthetic resin material, even if a recording medium is brought into contact with the opening portion 24 and the protrusion 51 at the time of its insertion or removal, the recording medium can be protected from any damage.

In the movable-body encased condition, an upper part 55 of the opening portion 24 at which is formed the upper opening guideway 54c faces with the other end of the protrusion 51 in the Y direction. In the movable-body encased condition, an upper end face 56 of the upper part 55 opposed to the movable body 3 is located above a free end face 57 of the protrusion 51. The upper end face 56 and the free end face 57 are arranged at a predetermined interval in the Z direction. Preferably the interval is so selected as to fall in a range of from 1.5 mm to 2.0 mm. By doing so, even if the upper part 55 of the opening portion 24 undergoes a flexure, it is possible to avoid that a gap between the upper end face 56 and the free end face 57 is greater than the thickness of a recording medium.

As described heretofore, in the navigation system 1, even if a gap is present between the movable body 3 and the electronic apparatus main body 2 in the movable-body encased condition, since the orthographical projections in the predetermined direction (the Y-directionally orthographical projections), respectively, of the protrusion 51 and the upper part 55 of the opening portion 24 are kept in superposed relation with each other, it follows that, when a foreign matter such as a recording medium is about to be inserted into the opening portion 24, the recording medium is abutted against the upper part 55 of the opening portion 24. This helps prevent insertion of a foreign matter such as a recording medium into the gap between the movable body 3 and the electronic apparatus main body 2. Accordingly, a flexible wiring board for establishing connection between the movable body 3 and the electronic apparatus main body 2 can be protected from a break caused by the abutment of a foreign matter, and also a recording medium can be protected from surface damage caused by its wrong insertion into the gap.

Particularly in the navigation system 1 mounted in a motor vehicle, there may be a case where a user is try to insert a recording medium into the opening portion 24 without paying any attention to the opening portion 24. Also in this case, it is possible to prevent occurrence of troubles both in the navigation system 1 and in a recording medium ascribable to inadvertent insertion of the recording medium into the gap between the movable body 3 and the electronic apparatus main body 2 as described hereinabove. Moreover, even if, as is the case with the present embodiment, the opening portion 24 is located close to the movable body 3 and thus the gap between the movable body 3 and the electronic apparatus main body 2 is contiguous with the opening portion 24, as has already been described, since inadvertent insertion of a recording medium into the gap between the movable body 3 and the electronic apparatus main body 2 can be prevented, it is possible to increase the degree of flexibility in the placement of the opening portion 24 in the electronic apparatus main body 2. Further, the protrusion 51 is so formed as to extend across the opposite ends of the movable body 3 in the X direction. This makes it possible to prevent inadvertent insertion of a recording medium into the gap between the movable body 3 and the electronic apparatus main body 2 without fail.

In addition, in the navigation system 1, insertion of foreign matters into the gap between the movable body 3 and the electronic apparatus main body 2 can be prevented by dint of the configurations of the movable body 3 and the electronic apparatus main body 2. That is, there is no need to provide an extra component adapted to prevent foreign matter insertion independently of the movable body 3 and the electronic apparatus main body 2, in consequence whereof there results no increase in structural complexity and assembly complexity. Accordingly, in contrast to a construction provided with a separate component such as a lid body, the navigation system 1 succeeds in offering enhanced productivity.

While, in the embodiment thus far described, the opening portion 24 is formed at the upper end of one end portion 22 of the first casing 21, the opening portion 24 may be formed at the lower end of one end portion 22 of the first casing 21 or may be formed at a certain intermediate part of one end portion 22 of the first casing 21.

Figure 4:
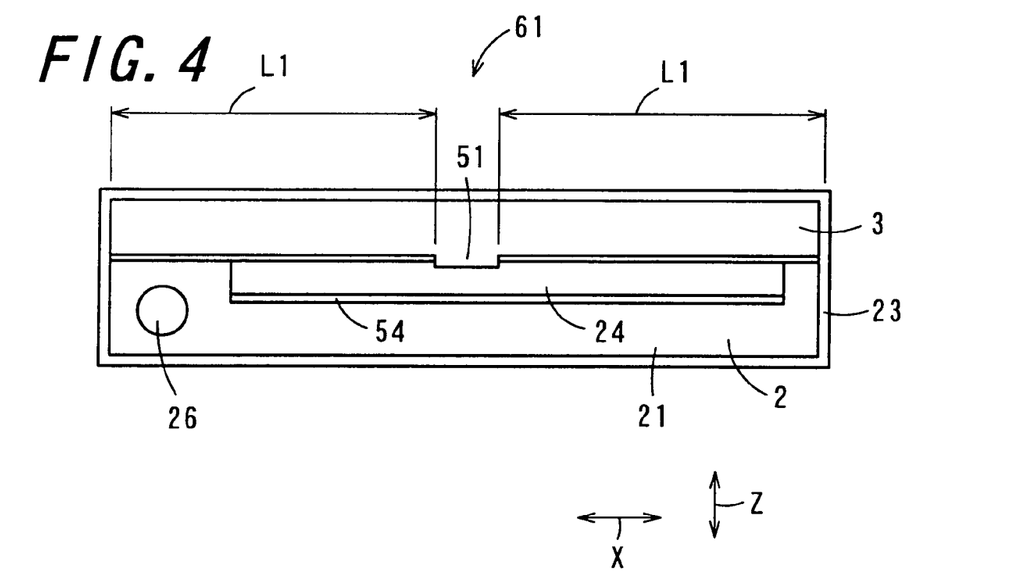
FIG. 4 is a front view of a navigation system in accordance with another embodiment of the invention.

FIG. 4 is a front view of a navigation system 61 in accordance with another embodiment of the invention. The navigation system 61 has basically the same structure as the navigation system 1 of the preceding embodiment shown in FIGS. 1A and 1B, the only difference being the configuration of the protrusion 51. Therefore, the components that play the same or corresponding roles as in the navigation system 1 will be identified with the same reference symbols, and the descriptions thereof will be omitted.

In the preceding embodiment, the protrusion 51 is so formed as to extend across the opposite ends of the movable body 3 in the X direction. By contrast, in this embodiment, the protrusion 51 is formed only at a certain part of the movable body 3 in the X direction instead of being formed so as to extend across the opposite ends of the movable body 3 in the X direction. More specifically, the protrusion 51 is positioned in such a manner that, when viewed from in front, a width L1 of the gap between the movable body 3 and the electronic apparatus main body 2 ranging in the X direction is smaller than the width of a recording medium insertable into the opening portion 24. For example, considering the possibility of insertion of any of a disc-shaped recording medium having a diameter of 8 cm and a disc-shaped recording medium having a diameter of 12 cm into the opening portion 24, then the protrusion 51 is so positioned that the width L1 is less than 8 cm. In this way, inadvertent insertion of a recording medium can be prevented successfully; that is, the same effects as achieved in the preceding embodiment can be achieved. Note that it is possible to provide a plurality of protrusions 51.

Figure 5:
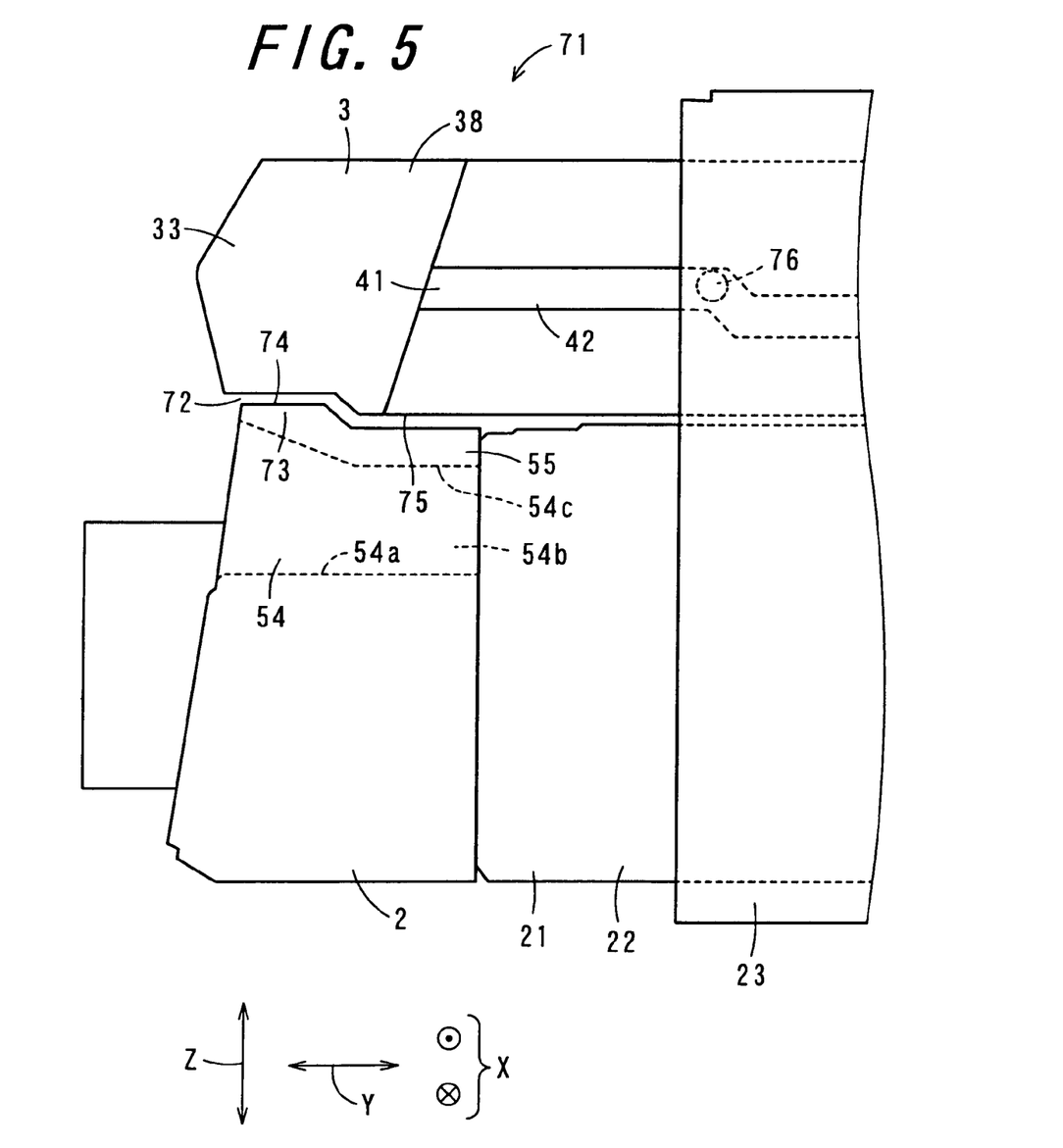
FIG. 5 is a side view of a navigation system in accordance with still another embodiment of the invention.

FIG. 5 is a side view of a navigation system 71 in accordance with still another embodiment of the invention, illustrating the side face of the navigation system 71 in the movable-body encased condition. The navigation system 71 is similar in structure to the navigation system 1 of the preceding embodiment shown in FIGS. 1A and 1B. Therefore, the components that play the same or corresponding roles as in the navigation system 1 will be identified with the same reference symbols, and the descriptions thereof will be omitted. In the navigation system 1 previously described, the protrusion 51 is formed in the movable body 3, and the concavity 53 is formed in the electronic apparatus main body 2. On the other hand, in the navigation system 71 of this embodiment, the movable body 3 is provided with a concavity 72 instead of the protrusion 51, and the electronic apparatus main body 2 is provided with a protrusion 73 instead of the concavity 53.

The free end portion 38 of the movable body 3 is formed with the concavity 72 located toward the other end thereof in the predetermined direction. The concavity 72 is formed in the third casing 33 so as to be recessed relative to the other remaining part of thicknesswise one surface portion 32 of the movable body 3, and is located at the end of the movable body 3 in the predetermined direction. That is, the other end of the movable body 3 in the predetermined direction located in the free end portion 38 is made smaller in thickness than the other remaining part of the movable body 3. The concavity 72 is formed so as to extend across the opposite ends of the movable body 3 in the X direction.

In the movable-body encased condition, that part of the electronic apparatus main body 2 which is opposed to the concavity 72 is formed with the protrusion 73. The protrusion 73 is formed at one end of the one end portion 22 of the first casing 21 in the Y direction so as to be located just above the opening portion 24. The upper opening guideway 54c of the opening portion 24 is so formed as to extend to one end of the first casing 21 in the Y direction. Likewise, the upper part 55 of the opening portion 24 is so formed as to extend to one end of the first casing 21 in the Y direction. The protrusion 73 is so formed as to extend across the opposite ends of the first casing 21 in the X direction. In the movable-body encased condition, the protrusion 73 is received in the space constituting the concavity 72, and the uppermost end of the protrusion 73 is located above the lowermost end of the movable body 3. A free end face 74 of the protrusion 73 and a surface 75 of the area of one surface portion 32 of the third casing 33 other than the area in which is formed the concavity 72 are arranged at a predetermined interval in the Z direction. Preferably the interval is so selected as to fall in a range of from 1.5 mm to 2.0 mm.

In the present embodiment, in order to avoid a contact between the protrusion 73 and the movable body 3 during the time the movable body 3 is being moved in the Y direction to achieve displacement from the encased condition to the unfolded condition, the slot 42 is formed in the third casing 33, and also, as the guide rail portion, a columnar member 76 is formed in the second casing 23. The columnar member 76 is inserted into the slot 42. For example, the slot 42 is cranked toward thicknesswise one end of the third casing 33, and the columnar member 76 is guided along the slot 42. In this way, during a one-way movement of the movable body 3 in the Y direction, the free end portion 38 of the movable body 3 can be moved upward. By virtue of such a simple configuration, it is possible to avoid a contact between the protrusion 73 and the movable body 3. That is, also in the present embodiment, the same effects as achieved in the preceding embodiment can be achieved.

In the embodiment thus far described, the concavity 72 is so formed as to extend across the opposite ends of the movable body 3 in the X direction, and similarly the protrusion 73 is so formed as to extend across the opposite ends of the first casing 21 in the X direction. Alternatively, the concavity 72 may be formed only at a certain part of the movable body 3 in the X direction, and correspondingly the protrusion 73 may be formed only in a location opposed to the concavity 72 in the movable-body encased condition. In this case, just like the protrusion 51 described previously, the concavity 72 and the protrusion 73 are positioned in such a manner that, when viewed from in front, the width of the gap between the movable body 3 and the electronic apparatus main body 2 ranging in the X direction is smaller than the width of a recording medium insertable into the opening portion 24. Also in such a structure, the same effects as achieved in the foregoing embodiment can be achieved.

While, in the foregoing embodiment, the protrusion 51 is formed at one end of the free end portion 38 of the movable body 3, the protrusion 51 may be formed at a certain intermediate part of the free end portion 38 of the movable body 3 in the Y direction instead of being formed at the end. In this case, the concavity 53 is formed in a location opposed to the protrusion 51 in the movable-body encased condition. In addition, in order to keep the protrusion 51 from contact with the first casing 21, there are provided the slot 42 and the guide rail portion such as adopted in the embodiment as shown in FIG. 5.

Moreover, while, in another foregoing embodiment, the concavity 72 is formed at one end of the free end portion 38 of the movable body 3 and the protrusion 73 is formed at one end of the one end portion 22 of the first casing 21, the concavity 72 may be formed at a certain intermediate part of the free end portion 38 of the movable body 3 in the Y direction instead of being formed at the end. In this case, the protrusion 73 is formed in a location opposed to the concavity 72 in the movable-body encased condition. In addition, in order to keep the protrusion 73 from contact with the movable body 3, there are provided the slot 42 and the guide rail portion such as adopted in the embodiment as shown in FIG. 5.

Figure 6:
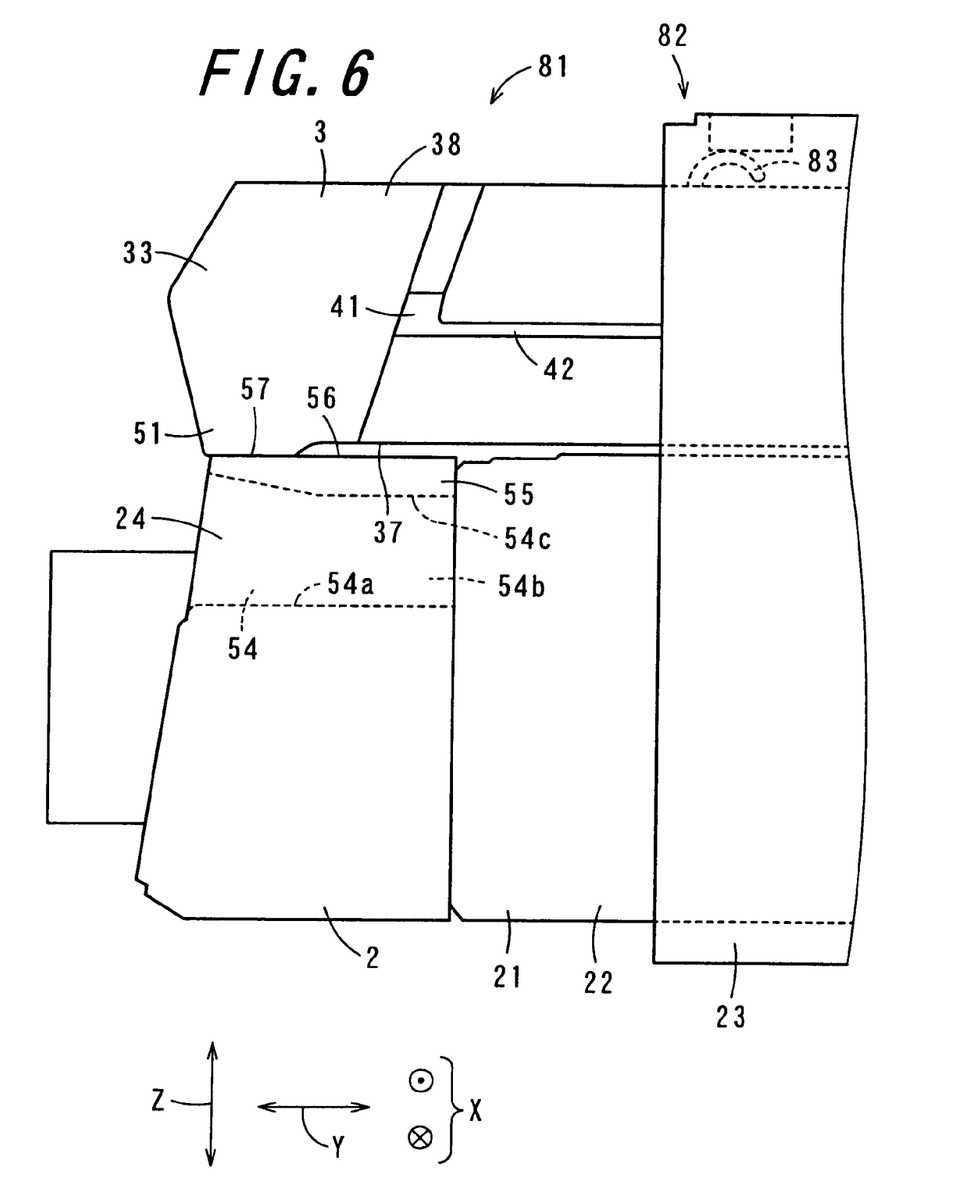
FIG. 6 is a side view showing a navigation system.

In each of the embodiments described hereinabove, the electronic apparatus main body 2 and the movable body 3 are so arranged that the orthographical projections in the predetermined direction, respectively, of at least a part of the free end portion 38 of the movable body 3 and at least a part of that area of the electronic apparatus main body 2 which is opposed to the free end portion 38 of the movable body 3 (one end portion 22 of the first casing 21) are kept in superposed relation with each other. Alternatively, the movable body 3 and the electronic apparatus main body 2 may be so arranged that the movable body 3 can be pressed into intimate contact with the first casing 21 of the electronic apparatus main body 2. Also in this case, it is possible to prevent insertion of foreign matters into the gap between the movable body 3 and the first casing 21. FIG. 6 is a side view showing a navigation system 81 having such a structure as described just above.

The navigation system 81 shown in FIG. 6 is analogous to the navigation system 1 shown in FIGS. 1A and 1B. Therefore, the components that play the same or corresponding roles as in the navigation system 1 will be identified with the same reference symbols, and the descriptions thereof will be omitted and only the points of difference will be described.

In the navigation system 1, the concavity 53 is formed in the first casing 21. On the other hand, in the navigation system 81, the first casing 21 is devoid of the concavity and thus its surface opposed to the movable body 3 in the movable-body encased condition is made flat. Therefore, the upper opening guideway 54c of the opening portion 24 extends to one end of the first casing 21 in the Y direction, and the upper part 55 of the opening portion 24 extends to one end of the first casing 21 in the Y direction as well.

The movable body 3 is provided with a pressing portion 82 for pressing the movable body 3 toward the first casing 21 in the encased condition. The pressing portion 82 includes a leaf spring member 83. The leaf spring member 83 is formed on thicknesswise the other surface portion of the third casing 33. When the movable body 3 is brought into its encased position by the slidingly displacing portion, the leaf spring member 83 is abutted against a part of the first casing 21, whereby the movable body 3 is pressed toward the first casing 21. Upon the first casing 21 being pressed by the leaf spring member 83, the protrusion 51 is abutted against the first casing 21 and is kept in intimate contact therewith. By virtue of such a structure, it is possible to prevent insertion of foreign matters into the gap between the first casing 21 and the movable body 3 and thus achieve the same effects as achieved in each of the foregoing embodiments.

Moreover, in the navigation system 81 shown in FIG. 6, the protrusion 51 is abutted against the first casing 21. However, in the movable-body encased condition, the protrusion 51 does not necessarily have to be abutted against the first casing 21, but may be spaced therefrom so long as a spacing between the protrusion 51 and the first casing 21 is smaller than the thickness of a recording medium. In this case, the movable body 3 may be pressed by the pressing portion 82 in such a manner as to secure the spacing. Also in this case, it is possible to prevent inadvertent insertion of a recording medium into the gap between the first casing 21 and the movable body 3 and thus achieve the same effects as achieved in each of the foregoing embodiments. Note that, in this case, the protrusion 51 does not necessarily have to be formed.

While, in each of the embodiments described hereinabove, a disc-shaped recording medium is regarded as the recording medium, a recording medium of any given shape can be the target recording medium, for example, a card-shaped recording medium having a nonvolatile memory, such as an SD card.

Further, while, in each of the embodiments described hereinabove, the display section 34 is disposed in the movable body 3, the movable body 3 may be provided with an input switch for issuing input signals to the electronic apparatus main body 2 instead of the display section 34. In this case, a switch piece of the input switch is so formed as to be exposed from thicknesswise one surface portion 32 of the third casing 33. In addition, the movable body 3 may be provided with an electronic device which is connected to the electronic apparatus main body 2. Even with the installation of any type of electronic components, it is possible to achieve the same effects as achieved in the foregoing embodiments.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and the range of equivalency of the claims are therefore intended to be embraced therein.

What is claimed is:

1. An electronic apparatus comprising:
   an electronic apparatus main body; and
   a movable body of which one end portion in a predetermined direction is supported by the electronic apparatus main body, and which is mounted in the electronic apparatus so as to be displaceable between an encased condition where one surface portion of the movable body is opposed to the electronic apparatus main body and an unfolded condition where the one surface portion is exposed to the outside,
   wherein the electronic apparatus main body and the movable body being so arranged that, in the movable-body encased condition, orthographical projections in the predetermined direction, respectively, of at least a part of the other end portion of the movable body in the predetermined direction and at least a part of that area of the electronic apparatus main body which is opposed to the other end portion of the movable body are kept in superposed relation with each other.

2. The electronic apparatus of claim 1, wherein the electronic apparatus main body includes:
   a slidingly displacing portion for allowing the movable body to be displaced under a condition where the one surface portion of the movable body is opposed to the electronic apparatus main body; and
   an angularly displacing portion for allowing the movable body to make angular displacement about an axis extending in a widthwise direction which is perpendicular to a direction in which the electronic apparatus main body and the movable body stack one upon another and to a direction in which the movable body is displaced by the slidingly displacing portion in the movable-body encased condition.

3. The electronic apparatus of claim 2, wherein the electronic apparatus main body is formed with an opening portion which is disposed at an end portion of the electronic apparatus main body close to the other end portion of the movable body, and is opened in the direction in which the movable body is displaced by the slidingly displacing portion, for effecting insertion and ejection of a recording medium.

4. The electronic apparatus of claim 3, wherein, in the movable-body encased condition, the other end portion of the movable body is opposed to the end portion of the electronic apparatus main body,
   wherein the other end portion of the movable body has an outwardly extending protrusion located toward the other end thereof in the predetermined direction,
   and wherein, in the movable-body encased condition, that part of the electronic apparatus main body which is opposed to the protrusion is formed with a concavity.

5. The electronic apparatus of claim 4, wherein, in the movable-body encased condition, the protrusion of the movable body constitutes a guide path for guiding a recording medium to the opening portion.

6. The electronic apparatus of claim 4, wherein the protrusion is formed in at least a certain part of the movable body in the widthwise direction, and is positioned in such a manner that, in the movable-body encased condition, a length of a gap between the electronic apparatus main body and the movable body in the widthwise direction is smaller than a width of a recording medium which is inserted into the opening portion.

7. The electronic apparatus claim 4, wherein the protrusion is made of a synthetic resin material.

* * * * *